United States Patent
Bravo et al.

(10) Patent No.: US 7,133,662 B2
(45) Date of Patent: Nov. 7, 2006

(54) METHODS AND APPARATUS FOR RESTRICTING ACCESS OF A USER USING A CELLULAR TELEPHONE

(75) Inventors: Jose F. Bravo, Mamoroneck, NY (US); Thomas A. Covalla, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 889 days.

(21) Appl. No.: 09/865,026

(22) Filed: May 24, 2001

(65) Prior Publication Data

US 2002/0177433 A1 Nov. 28, 2002

(51) Int. Cl.
H04M 1/66 (2006.01)
(52) U.S. Cl. ............... 455/411; 455/410; 455/422.1
(58) Field of Classification Search ....... 455/411–412.1, 455/412.2, 414.1–414.3, 415, 418, 419, 420, 455/424–425, 565, 554.1, 554.2, 556.1, 410, 455/435.1, 556.2, 557, 558, 422, 422.1; 379/183, 185, 189; 713/183, 184, 185, 190, 713/200, 201, 202
See application file for complete search history.

(56) References Cited

U.S. PATENT DOCUMENTS

| | | | | |
|---|---|---|---|---|
| 4,310,720 A | * | 1/1982 | Check, Jr. ............... | 713/155 |
| 5,046,082 A | * | 9/1991 | Zicker et al. ............ | 455/419 |
| 5,068,894 A | * | 11/1991 | Hoppe .................... | 713/172 |
| 5,323,465 A | * | 6/1994 | Avarne ................... | 713/184 |
| 5,457,737 A | * | 10/1995 | Wen ....................... | 455/410 |
| 5,491,752 A | * | 2/1996 | Kaufman et al. ........ | 380/30 |
| 5,497,411 A | * | 3/1996 | Pellerin ................... | 455/411 |
| 5,657,388 A | * | 8/1997 | Weiss ...................... | 713/185 |
| 5,701,339 A | * | 12/1997 | Suda ....................... | 379/67.1 |
| 5,749,052 A | * | 5/1998 | Hidem et al. ............ | 455/406 |
| 5,842,124 A | * | 11/1998 | Kenagy et al. ........... | 455/418 |
| 5,892,902 A | * | 4/1999 | Clark ...................... | 713/201 |
| 5,953,422 A | * | 9/1999 | Angelo et al. ........... | 713/185 |
| 5,971,272 A | * | 10/1999 | Hsiao ...................... | 235/380 |
| 6,169,890 B1 | * | 1/2001 | Vatanen .................. | 455/406 |
| 6,278,863 B1 | * | 8/2001 | Mabrouki ............... | 455/63.1 |

(Continued)

FOREIGN PATENT DOCUMENTS

EP 1119147 A1 * 7/2001

(Continued)

OTHER PUBLICATIONS

Hidenori et al., "Chargeable Information Sending Method, Device Therefor, and Recording Medium," Patent Abstracts of Japan, Publication No. 10-334048 (Dec. 18, 1998).

(Continued)

*Primary Examiner*—CongVan Tran
(74) *Attorney, Agent, or Firm*—Ryan, Mason & Lewis, LLP (57) ABSTRACT

A method and apparatus are disclosed for preventing unauthorized access to a restricted item using a cellular telephone that has been previously associated with a user, for example, during a registration process. The user is initially identified, for example, by entering a password, and a one-time pseudo-random token is provided to the user using a first communication channel. The user is requested to dial a telephone number associated with an access control service using a cellular telephone that has been previously associated with the user and enter the assigned token. The user obtains access to the restricted item if the assigned token is entered from a cellular telephone having a serial number that has been previously associated with the particular user.

7 Claims, 4 Drawing Sheets

U.S. PATENT DOCUMENTS

| | | | |
|---|---|---|---|
| 6,308,268 B1 * | 10/2001 | Audebert | 713/182 |
| 6,330,608 B1 * | 12/2001 | Stiles | 709/229 |
| 6,334,056 B1 * | 12/2001 | Holmes et al. | 455/445 |
| 6,349,134 B1 * | 2/2002 | Katz | 379/92.01 |
| 6,385,729 B1 * | 5/2002 | DiGiorgio et al. | 726/9 |
| 6,387,729 B1 * | 5/2002 | Eng et al. | 438/106 |
| 6,393,468 B1 * | 5/2002 | McGee | 709/218 |
| 6,466,780 B1 * | 10/2002 | Geiselman et al. | 455/411 |
| 6,535,726 B1 * | 3/2003 | Johnson | 455/406 |
| 6,584,309 B1 * | 6/2003 | Whigham | 455/414.1 |
| 6,707,915 B1 * | 3/2004 | Jobst et al. | 380/247 |
| 6,731,731 B1 * | 5/2004 | Ueshima | 379/196 |
| 2002/0095588 A1 * | 7/2002 | Shigematsu et al. | 713/186 |

FOREIGN PATENT DOCUMENTS

| | | |
|---|---|---|
| JP | 2001-111545 A | 4/2001 |
| WO | WO 01/09808 | 2/2001 |

OTHER PUBLICATIONS

Kim, S, "Authentication Method in Data Transmission System and System to Execute the Authentication Method," Patent Abstracts of Japan, Publication No. 10-341224 (Dec. 22, 1998).

* cited by examiner

FIG. 3
AUTHORIZED USER DATABASE - 300

| USER IDENTIFIER | PASSWORD | CELLULAR TELEPHONE IDENTIFIER |
|---|---|---|
| | | |
| | | |
| | | |
| | | |

FIG. 4
CELLULAR ROUTING DATABASE - 400

| CELLULAR TELEPHONE NUMBER | TELEPHONE SERIAL NUMBER | LOCAL COVERAGE AREA |
|---|---|---|
| | | |
| | | |
| | | |
| | | |

FIG. 5

METHODS AND APPARATUS FOR RESTRICTING ACCESS OF A USER USING A CELLULAR TELEPHONE

FIELD OF THE INVENTION

The present invention relates generally to access control techniques, and more particularly, to a method and apparatus for restricting access of a user to a particular device, service, account or secure facility.

BACKGROUND OF THE INVENTION

Computers and other devices, as well as secure facilities, services and financial accounts, often contain proprietary, personal and/or sensitive information, which could be compromised if accessed by unauthorized individuals. Thus, such devices, facilities, services and accounts (hereinafter, collectively referred to as "restricted items") often incorporate security techniques, such as database access control mechanisms, to prevent unauthorized users from accessing, obtaining or altering the proprietary, personal and/or sensitive information. Authentication techniques allow users to prove their identity and obtain authorized access to a given restricted item.

A number of authentication protocols have been developed to prevent the unauthorized access of restricted items. Historically, authentication techniques have been evaluated based on the number of independent items (or factors) that are required for the user to obtain access to the restricted item. An authentication technique is typically considered to provide "strong authentication" if the technique requires the user to provide two independent items (or factors), often referred to as a "two factor authentication." For example, a safe or vault that requires a combination (something the user knows) and a key (something the user has) provides two factor authentication. Typically, there is an inverse relationship between the level of security provided by a given authentication protocol and the corresponding impact the security measures have on the convenience to the user.

For example, a persistent cookie is often stored on a user's computer by a given server to identify the user upon a return visit to the same web-site. Persistent cookies offer the highest level of convenience for authentication behind a browser. A hacker, however, can typically easily obtain access to a user's computer, obtain the cookie and thereafter impersonate the user. Thus, persistent cookies are satisfactory only for applications requiring minimal security, such as a subscription to an online newspaper. Persistent cookies are considered a "one factor authentication," since they rely only on something that the user has (in the user's browser).

In another common variation, access control mechanisms typically utilize some variation of an alphanumeric personal identification number (PIN) or password, that is presumably known only to the authorized user. Upon attempting to access a given restricted item, the user enters the appropriate password, to establish his or her authority. Many users select a PIN or password that is easy to remember. Thus, there is a significant risk that such passwords may be guessed or otherwise compromised, in which case an attacker can access the given restricted item.

To minimize the risk that a password will be compromised, the number of login attempts that may be attempted are often limited, so that an attacker cannot keep trying different passwords until successful. In addition, users are often encouraged or required to change their password periodically. These conditions make passwords too inconvenient for most applications, such as Internet usage. Password-based access control techniques are considered a "one factor authentication," since they rely on something that the user knows.

One-time passwords have also been proposed to further increase security, where users are assigned a secret key that may be stored, for example, on a pocket token or a computer-readable card. Upon attempting to access a desired restricted item, a random value, referred to as a "challenge," is issued to the user. The pocket token or computer-readable card then generates a "response" to the challenge by encrypting the received challenge with the user's secret key. The user obtains access to the restricted item, provided the response is accurate. In order to ensure that the pocket token or computer-readable card is utilized by the associated authorized user, the user typically must also manually enter a secret alphanumeric PIN or password. One-time passwords are generally considered very secure and provide a "two factor authentication," since they rely on something that the user has (the pocket token or computer-readable card) and something that the user knows (the password or PIN).

While such authentication tools reduce the unauthorized access to restricted items, they suffer from a number of limitations, which if overcome, could dramatically increase the utility and effectiveness of such tools. For example, the requirement that the user must carry the pocket token or computer-readable card may not be practical for widespread deployment. Thus, a number of security systems that do not rely on a pocket token or computer-readable card have been developed. For example, a number of access control mechanisms have secured access to devices or secure locations by evaluating biometric information, such as fingerprints, retinal scans or voice characteristics. Unfortunately, however, the transmission of biometric information over a network can be computationally expensive and consume significant network bandwidth. In addition, such biometric access control systems require some kind of biometric reader at the location of the user to capture the biometric information.

A need therefore exists for an improved access control mechanism that does not require the user to carry any additional device, such as a pocket token or computer-readable card, beyond what the user would normally carry. A further need exists for an access control mechanism that uses a telephone call placed to or from a particular cellular telephone associated with the user to verify the identity of a person who is requesting access to a restricted item. Yet another need exists for an access control mechanism that provides strong security without significantly impacting the convenience of the user.

SUMMARY OF THE INVENTION

Generally, a method and apparatus are provided for preventing unauthorized access to a restricted item, such as a device, facility, service or account, using a cellular telephone that has been previously associated with a user, for example, during a registration process. Once the user is initially identified, a token is provided to the user using a first communication channel. The user is requested to enter the token from the cellular telephone that has been previously associated with the user. The user will obtain access to the restricted item only if the user enters the correct token from a cellular telephone having a serial number that has been previously associated with this user.

Cellular telephones provide an effective and reliable mechanism for increasing the integrity of access control systems. The present invention provides the security of a "two factor" authentication scheme, since it relies on something that the user has (the cellular telephone) and something that the user knows (e.g., a password that provides access to a one-time pseudo-random token), with a reduced cost of deployment and maintenance. The user is not required to carry any additional or special purpose hardware. In addition, the high level of care that most users naturally employ for their cellular telephones provides additional safeguards that ensure that the user will not readily loan their cellular phone to another person and will promptly cancel cellular service should the cellular In an exemplary three-party implementation, a user attempts to access a restricted item provided by a restricted item provider, such as a financial institution or content provider. An access control administrator, such as a cellular service provider, serves as an intermediary between the restricted item provider and the user to validate the accuracy of a token submitted from a cellular telephone previously associated with the user. Generally, the restricted item provider generates a one-time pseudo-random token associated with a particular transaction and sends a message to the access control administrator that identifies the restricted item provider and includes the user's cellular telephone number and the assigned one-time pseudo-random token. In addition, the restricted item provider sends a second message to the user that contains an instruction to dial a telephone number associated with the access control system and enter the assigned token.

The user then dials the telephone number associated with the access control system over the cellular network and enters the assigned token. The access control administrator (i) compares the token received with the cellular telephone call with the one-time pseudo-random token indicated by the restricted item provider in the first message, and (ii) ensures that the cellular telephone call has been placed from a cellular telephone having a serial number that has been previously associated with the particular user. A cellular telephone call is routed through a cellular network on the basis of a serial number associated with a given cellular telephone. Thus, the completion of the call to the access control administrator ensures that the call has been placed from the cellular telephone associated with the user. If the access control administrator confirms that the correct token is received from the cellular telephone having a serial number that has been previously associated with the particular user, then the access control administrator will send a message to the restricted access provider indicating that the user's cellular telephone number and entered token match the information in the message received from the restricted item provider. Finally, the user will be provided access to the restricted item.

A more complete understanding of the present invention, as well as further features and advantages of the present invention, will be obtained by reference to the following detailed description and drawings.

DETAILED DESCRIPTION OF PREFERRED EMBODIMENTS

The present invention provides an access control technique with increased security by providing a one-time pseudo-random token to a user attempting to access a restricted item using a first channel and confirming the accuracy of the token submitted by the user using a cellular telephone channel that has been previously associated with the user, for example, during a registration process. Typically, the user is not presented with the one-time pseudo-random token until the user has entered some personal information, such as a user name and password. The present invention provides a "two factor" authentication scheme, since it relies on something that the user has (the cellular telephone) and something that the user knows (a password that provides access to the one-time pseudo-random token).

The present invention recognizes that cellular telephones are typically used to make and receive telephone calls, some of which can be very private in nature. In addition, cellular telephones are often used to place or receive long distance telephone calls, some of which can be very expensive. Furthermore, cellular telephones have become nearly ubiquitous in today's world. Most users of cellular telephones carry the cellular telephone with them wherever they go and protect the cellular telephone with a level of care that is greater than most of their possessions. In addition, most users of cellular telephones do not easily loan their cellular telephones to others.

Another important cultural aspect of the usage of cellular telephones has to do with the typical reaction of a user whose cellular telephone has been lost or stolen. Typically, a user will promptly suspend the cellular service to prevent unauthorized telephone calls. Another important characteristic of cellular telephones is that cellular providers can implement anti-cloning or privacy features to prevent cellular cloning and eavesdropping. When the anti-cloning or privacy features are activated for a given cellular telephone, transmission of the serial number of the cellular telephone 115 between the cellular telephone 115 and the cellular station (not shown) are strongly encrypted. It is further noted, that even if a cellular telephone is cloned, the particular user has not been targeted, but rather the cloner has merely obtained the serial number of the user's cellular telephone. Thus, the cloner would like not have access to what the user knows (i.e., the user name and password).

Figure 1:
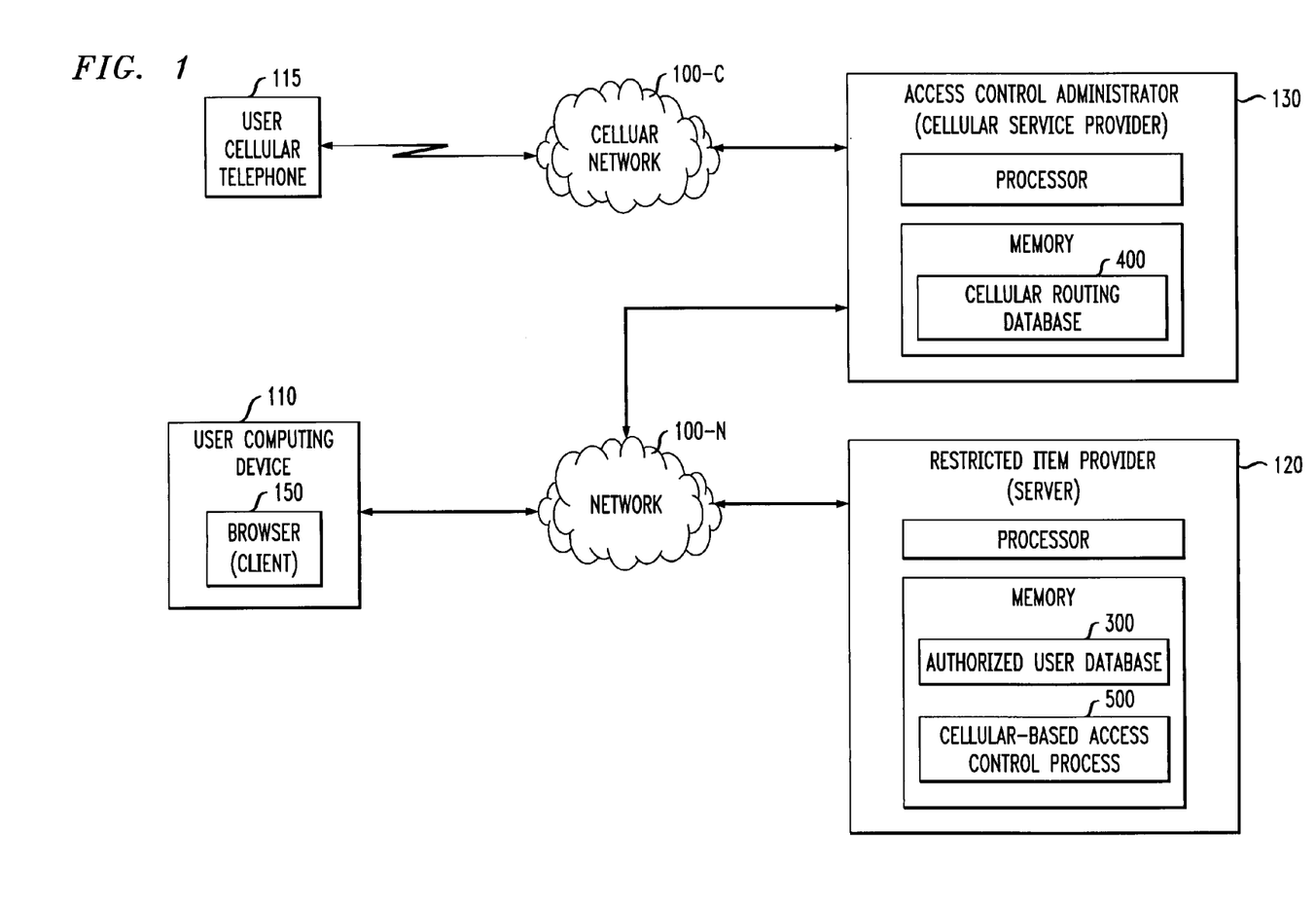
FIG. 1 illustrates a network environment for an exemplary three-party implementation of the present invention.

Thus, cellular telephones can effectively and reliably be used as part of an access control technique to confirm the accuracy of the one-time pseudo-random token submitted by the user using a cellular telephone channel. Relative to prior access control techniques, the present invention provides a high degree of security (two factor authentication) with a reduced cost of deployment and maintenance. Further, the present invention does not require the user to carry any special purpose hardware. The user can enter the token using the general-purpose cellular telephone already carried by many users. In addition, the high level of care that most users naturally employ for their cellular telephones provides additional safeguards that ensure that the user will not readily loan their cellular phone to another person and will promptly cancel cellular service should the cellular FIG. 1 illustrates a network environment 100 in which the present invention can operate. FIG. 1 illustrates an exemplary three-party implementation where a user, implementing a user computing device 110, attempts to access a restricted item provided by a restricted item provider 120, for example, over an Internet connection. In the exemplary three-party implementation shown in FIG. 1, an access control administrator 130, such as the user's cellular service provider, serves as an intermediary between the restricted item provider 120 and the user 110 to validate the accuracy of a token submitted from a cellular telephone 115 previously associated with the user over a cellular network 100-C. While the network 100-N can be any network for transferring information, such as a data network or a telephone network, the present invention requires that the user 110 provides the assigned token over the cellular network 100-C from the cellular telephone 115 previously associated with the user 110.

Figure 2:
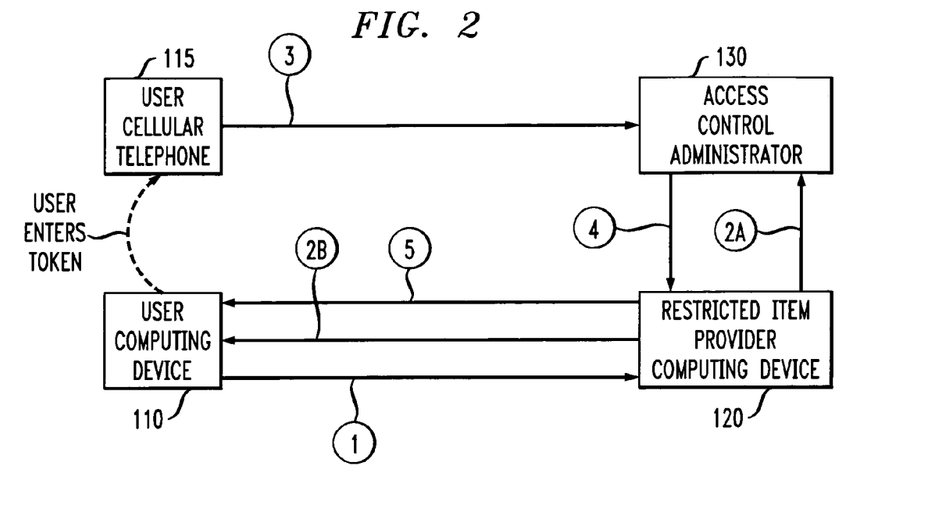
FIG. 2 illustrates the flow of information in the exemplary three-party implementation of FIG. 1.

FIG. 2 illustrates the flow of information in the exemplary three-party implementation of FIG. 1. As shown in FIG. 2, the user operating the computing device 110 initially sends a request to access a restricted item provided by the restricted item provider 120 during step 1 over the network 100-N. The user request may optionally include a user name and password that identifies the user to the restricted item provider 120 (providing one of the two factors required for authentication). As discussed further below in conjunction with FIG. 5, the user request causes the restricted item provider 120 to activate a process 500 to verify the identity of the user in accordance with the techniques of the present invention. Generally, the restricted item provider 120 generates a one-time pseudo-random token associated with the present transaction and sends a first message to the access control administrator 130 during step 2A that identifies the restricted item provider 120 and includes the user's cellular telephone number and the assigned token. The first message may also optionally include an amount associated with the transaction that the user must approve. The first message may optionally be encrypted, digitally signed and with mutual authentication, for example, using PKI techniques. In addition, the restricted item provider 120 will send a second message to the user 110 during step 2B that contains an instruction to dial a specified telephone number and enter the assigned token. Communications between the restricted item provider 120 and the user 110 may be exchanged, e.g., using a secure socket layer (SSL) connection.

The user then dials the telephone number associated with the access control service over the cellular network 100-C during step 3 and enters the assigned token. In one embodiment, the specified telephone number may be associated with an interactive voice response unit (IVRU) provided by the access control administrator 130. The IVRU may optionally prompt the user to enter the specified token. In a further variation, a connection between the user 110 and the access control administrator 130 can be established to exchange text messages on the display of the cellular telephone 115, rather than employing an IVRU.

The access control administrator 130 (i) compares the token received with the cellular telephone call during step 3 with the token indicated by the restricted item provider 120 in the first message during step 2A, and (ii) ensures that the cellular telephone call has been placed from a cellular telephone 115 having a serial number that has been previously associated with the particular user 110. Since a telephone call is routed through a cellular network 100-C on the basis of a serial number associated with a given cellular telephone 115, the proper routing of the call to the access control administrator 130 ensures that the call has been placed from the cellular telephone 115 associated with the user.

Generally, when a user desires to place a cellular telephone call, the user enters the appropriate digits and hits the "send" button. This will cause a "send" request to be sent to a cell station on the broadcast channel with the serial number of the user's cellular telephone. The cell site assigns a channel to the call and sends a message on the reverse broadcast channel with the serial number and the corresponding channel assignment. Thereafter, the cellular telephone goes to the specified channel to place the call. Due to this translation between cellular telephone numbers and serial numbers performed within the cellular telephone network 100-C, the completion of the call to the indicated telephone number ensures that the cellular telephone 115 has the previously assigned serial number.

If the access control administrator 130 confirms that the correct token is received during step 3 from the cellular telephone 115 having a serial number that has been previously associated with the particular user 110, then the access control administrator 130 will send a message to the restricted access provider 120 during step 4 indicating that the user's cellular telephone number and the entered token match the information in the message received from the restricted item provider during step 2A. Finally, the user will be provided access to the restricted item during step 5.

The user computing device 110 may be embodied, for example, as any general-purpose computing device from which a user may attempt to access a restricted item and which can display the digits of an assigned token, such as a personal computer, workstation, automated teller machine (ATM), point-of-sale (POS) terminal or personal digital assistant (PDA). The computing device employed by the restricted item provider 120 to communicate with the user 110 may be embodied, for example, as a personal computer, workstation or server. As shown in FIG. 1, the memory of the server 120 includes an authorized user database 300 and a cellular-based access control process 500, each discussed below in conjunction with FIGS. 3 and 5, respectively. The device employed by the access control administrator 130 may be embodied, for example, as a personal computer, workstation, interactive voice response unit or server. As shown in FIG. 1, the memory of the device 130 includes a cellular routing database 400, discussed below in conjunction with FIG. 4.

Databases

Figure 3:
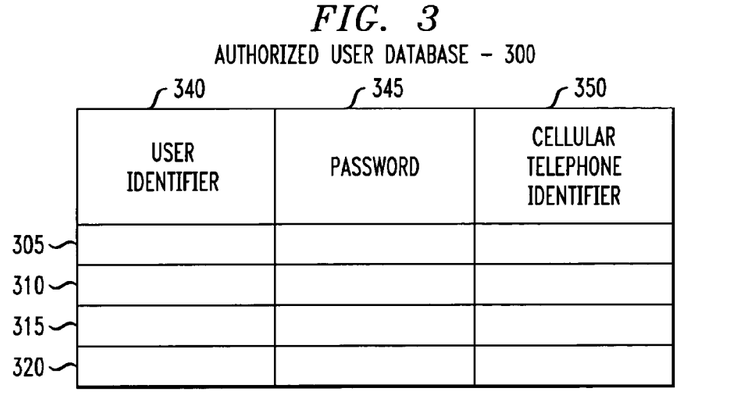
FIG. 3 is a sample table from the authorized user database maintained by the restricted item provider of FIG. 1.

FIG. 3 is a sample table from the authorized user database 300 maintained by the restricted item provider 120. Generally, the authorized user database 300 identifies each authorized user and provides a corresponding cellular telephone identifier that may be utilized to control the access of the user to a restricted item in accordance with the present invention. Thus, as shown in FIG. 3, the authorized user database 300 includes a plurality of records 305–320, each associated with a different authorized user. For each user identified in field 340, the authorized user database 300 indicates the user's password in field 345 and a corresponding cellular telephone number that has been associated with the user in field 350. In this manner, when the user attempts to access a restricted item, the provider 120 of the item can access the database 300 and determine the cellular telephone from which a token associated with the transaction should be expected.

Figure 4:
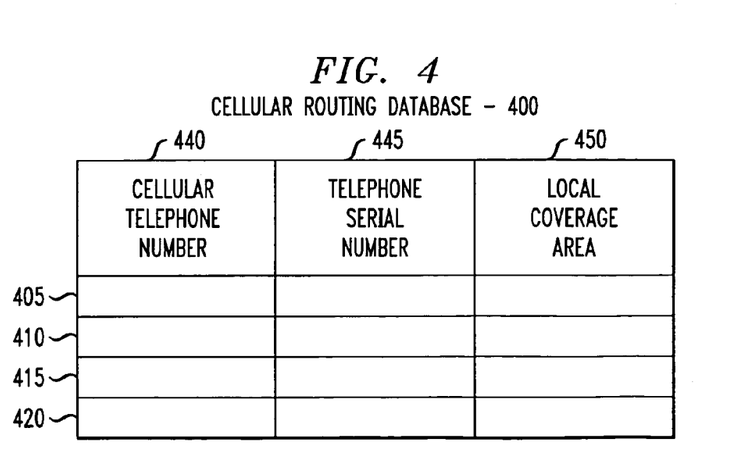
FIG. 4 is a sample table from the cellular routing database maintained by the access control administrator of FIG. 1.

FIG. 4 is a sample table from the cellular routing database 400 maintained by the access control administrator 130. Generally, the cellular routing database 400 is the same routing table found in each cellular site in a cellular network 100-C and indicates how a call should be routed to a given cellular telephone number. It is well known that a cellular telephone call is routed to a particular user using the serial number of the cellular telephone that has been previously associated with the user. Thus, as shown in FIG. 4, the cellular routing database 400 includes a plurality of records 405–420, each associated with a different cellular telephone user. For each cellular telephone identified in field 440, the cellular routing database 400 indicates the corresponding telephone serial number in field 445 and, optionally, a local coverage area identifier in field 450 indicating the regions in which the user is typically located.

Processes

Figure 5:
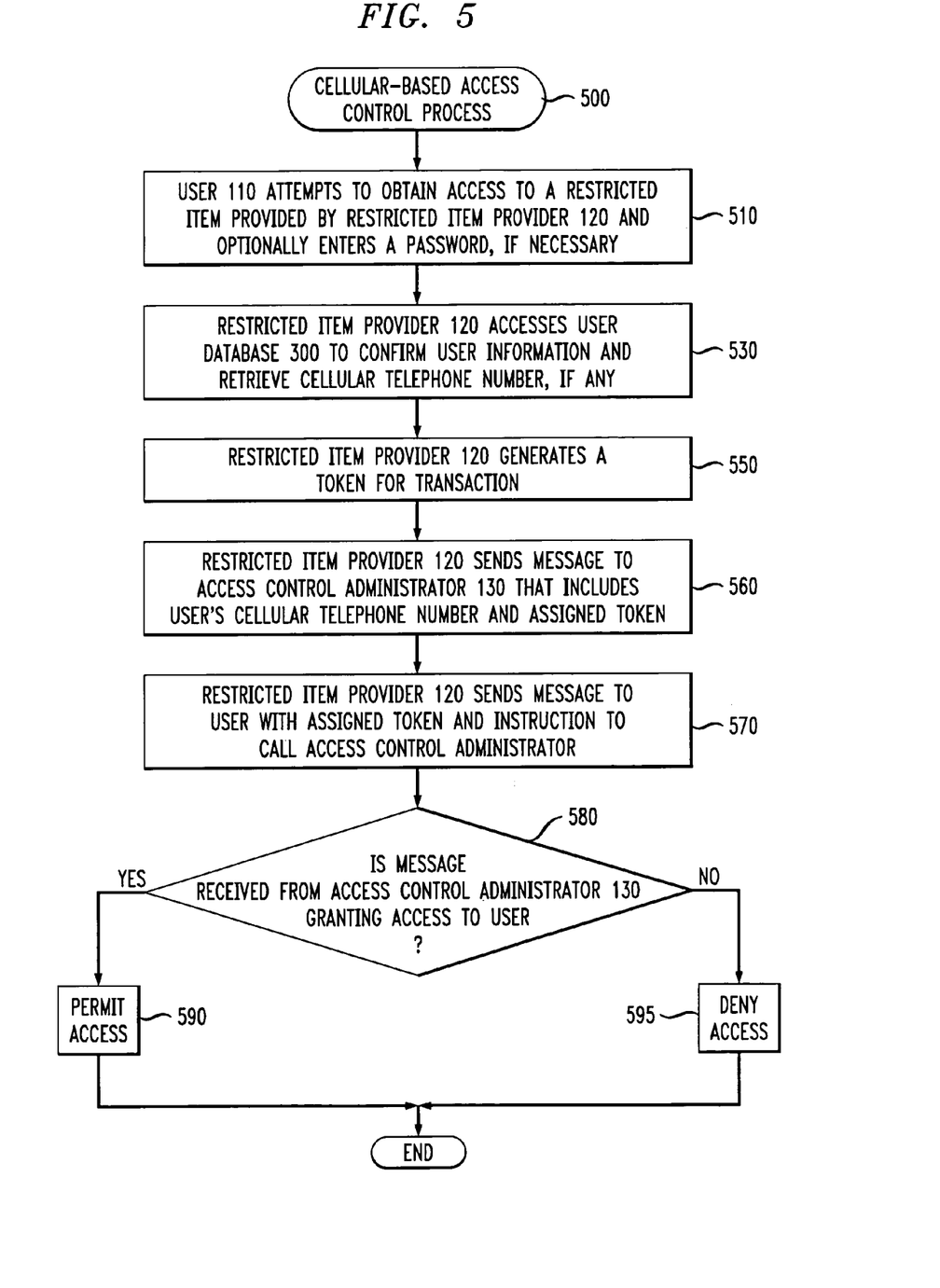
FIG. 5 is a flow chart describing a cellular-based access control process inplemented by the restricted item provider 120.

FIG. 5 is a flow chart describing an implementation of the present invention from a process point of view for the restricted item provider 120. The corresponding processes performed by the user 110 and access control administrator 130 would be obvious to a person of ordinary skill in the art based on the disclosure herein. As shown in FIG. 5, a user 110 initially attempts to access a restricted item during step 510, and optionally enters a user name and/or a password as part of the authentication process.

Once the user is identified, the cellular-based access control process 500 accesses the user database 300 during step 530 to confirm any submitted user information and retrieve the cellular number that has previously been associated with the user. The restricted item provider 120 then generates a token during step 550 that is associated with the transaction. Thereafter, the restricted item provider 120 sends a message to the access control administrator 130 during step 560 that includes the user's cellular telephone number and the token assigned to the transaction. In addition, the restricted item provider 120 sends a message to the user 110 during step 570 that includes the token assigned to the transaction and an instruction to call the access control administrator 130 using the previously associated cellular telephone 115. Meanwhile, the user will contact the access control administrator 130 and enter the indicated token.

A test is then performed during step 580 to determine if a message is received from the access control administrator 130 granting access to the user 110. If it is determined during step 580 that a message is received from the access control administrator 130 granting access to the user 110, then the user is granted access to the restricted item during step 590. If, however, it is determined during step 580 that a message is not received from the access control administrator 130 granting access to the user 110, then the user is denied access to the restricted item during step 595. Program control then terminates.

Two-Party Embodiment

Figure 6:
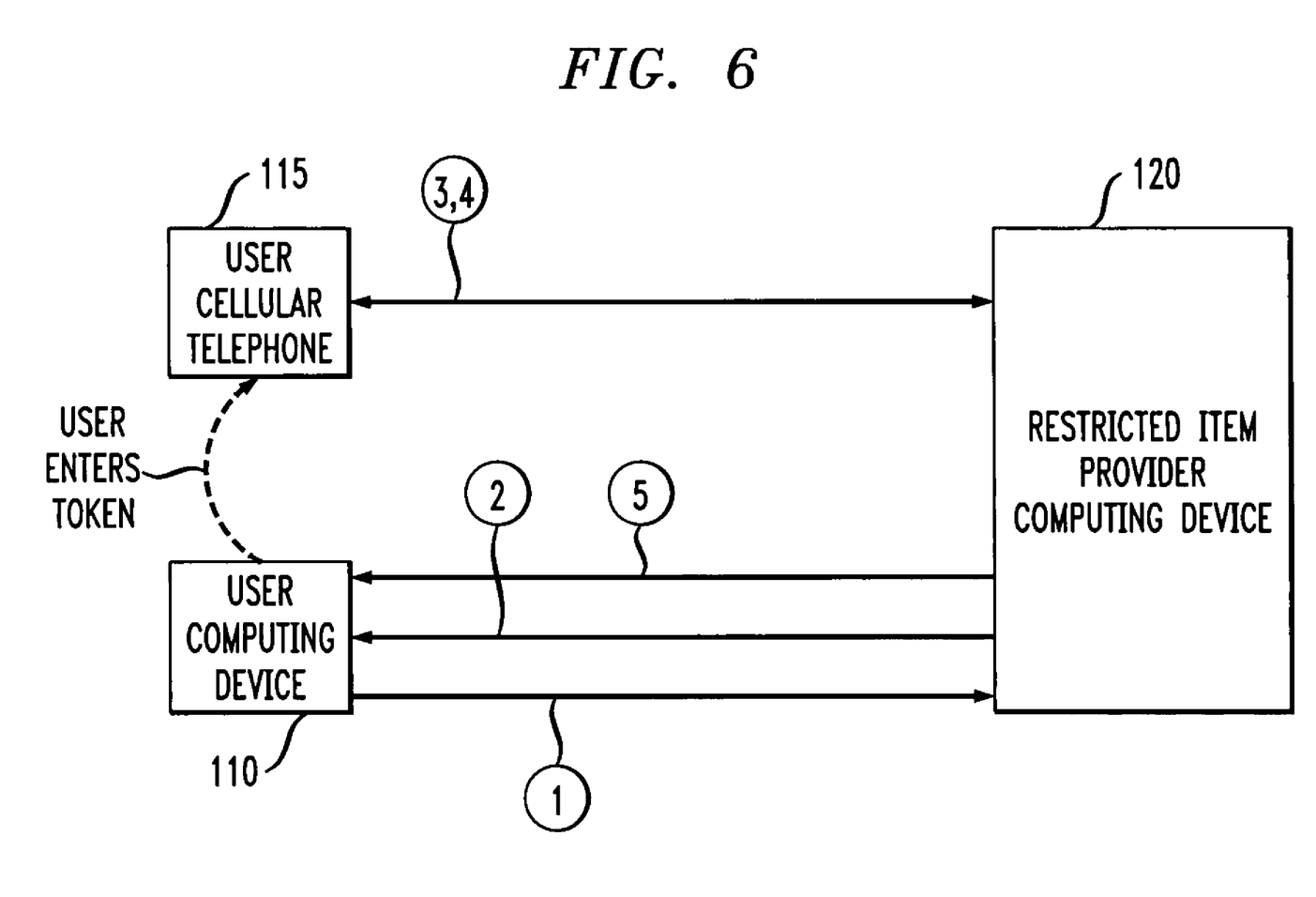
FIG. 6 illustrates the flow of information in an exemplary two-party implementation of the present invention.

FIG. 6 illustrates the flow of information in an exemplary alternate two-party implementation of the present invention. Generally, in a two-party embodiment, the restricted item provider 120 does not outsource the access control administration to the administrator 130 and performs such access control functions in accordance with the present invention itself. As shown in FIG. 6, the user operating the computing device 110 initially sends a request to access a restricted item provided by the restricted item provider 120 during step 1 over the network 100-N. The user request may optionally include a user name and password that identifies the user to the restricted item provider 120. The user request causes the restricted item provider 120 to verify the identity of the user in accordance with the techniques of the present invention, in a similar manner to the three-party embodiment discussed above. The restricted item provider 120 will send a message to the user 110 over the network 110-N during step 2 that contains a token assigned to the transaction.

The restricted item provider 120 also initiates a cellular telephone call during step 3 to the telephone number that has previously been associated with the user (as indicated in the authorized user database 300). As previously indicated, the telephone call will be routed by the cellular service provider to the cellular telephone 115 associated with the user over the cellular network 100-C using the serial number entered for the user in the routing tables. The user will then receive the telephone call and be instructed to enter the token displayed on the screen during step 4.

The restricted item provider 120 will then compare the token received with the cellular telephone call during step 4 with the token assigned to the transaction. Since a telephone call is routed through a cellular network 100-C on the basis of a serial number associated with a given cellular telephone 115, the proper routing of the call to the user 110 ensures that the call has been placed from the cellular telephone 115 associated with the user. If the restricted item provider 120 confirms that the correct token is received during step 4 from the cellular telephone 115 having a serial number that has been previously associated with the particular user 110, then the user will be provided access during step 5.

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

The memories shown in FIG. 1 will configure the processors to implement the methods, steps, and functions disclosed herein. The memory could be distributed or local and the processor could be distributed or singular. The memory could be implemented as an electrical, magnetic or optical memory, or any combination of these or other types of storage devices. Moreover, the term "memory" should be construed broadly enough to encompass any information able to be read from or written to an address in the addressable space accessed by processor. In an alternate implementation, the present invention can be implemented using an application specific integrated circuit (ASIC), as would be apparent to a person of ordinary skill in the art.

It is to be understood that the embodiments and variations shown and described herein are merely illustrative of the principles of this invention and that various modifications may be implemented by those skilled in the art without departing from the scope and spirit of the invention.

What is claimed is:

1. A access control method for restricting access of a user to a restricted item, said method comprising the steps of:
   providing a token to an access control administrator;
   providing said token to said user using a first communication channel;
   instructing said user to dial a telephone number associated with said access control administrator using a cellular telephone that has been previously associated with said user to enter said provided token;
   providing access to said user if said entered token matches said provided token and is received via a wireless connection from a cellular telephone having a serial number previously associated with said user; and
   receiving an indication from said access control administrator indicating that said entered token matches said provided token and was received from a cellular telephone having a serial number previously associated with said user.

2. The method of claim 1, wherein said access control administrator compares said entered token to said provided token.

3. The method of claim 1, further comprising the step of providing a cellular telephone number that has been previously associated with said user to said access control administrator and wherein said access control administrator determines a cellular telephone number associated with a serial number of a cellular telephone from which said token was received and compares said provided cellular telephone number with said determined cellular telephone number.

4. The method of claim 1, further comprising the step of receiving a password from said user before providing said token.

5. The method of claim 1, wherein said token is a pseudo-random number.

6. A access control system for restricting access of a user to a restricted item, comprising:
   a memory that stores computer-readable code; and
   a processor operatively coupled to said memory, said processor configured to implement said computer-readable code, said computer-readable code configured to:
   provide a token to an access control administrator;
   provide said token to said user using a first communication channel;
   instruct said user to dial a telephone number associated with said access control administrator using a cellular telephone that has been previously associated with said user to enter said provided token; and
   provide access to said user if said entered token matches said provided token and is received via a wireless connection from a cellular telephone having a serial number previously associated with said user.

7. An article of manufacture for implementing an access control method that restricts access of a user to a restricted item, comprising:
   a computer readable medium having computer readable code means embodied thereon, said computer readable program code means comprising:
   a step to provide a token to an access control administrator;
   a step to provide said token to said user using a first communication channel;
   a step to instruct said user to dial a telephone number associated with said access control administrator using a cellular telephone that has been previously associated with said user to enter said provided token; and
   a step to provide access to said user if said entered token matches said provided token and is received via a wireless connection from a cellular telephone having a serial number previously associated with said user.

* * * * *